United States Patent
Harrison et al.

(10) Patent No.: US 10,556,609 B2
(45) Date of Patent: Feb. 11, 2020

(54) SHOPPING CART BASKET WITH FORWARD HANDLE

(71) Applicant: Unarco Industries LLC, Wagoner, OK (US)

(72) Inventors: William Timothy Harrison, Muskogee, OK (US); Gregory Eric Dallen, Broken Arrow, OK (US); Ryan Witchey, Olathe, KS (US); Wesley McMurtrey, Bixby, OK (US)

(73) Assignee: Unarco Industries LLC, Wagoner, OK (US)

( * ) Notice: Subject to any disclaimer, the term of this patent is extended or adjusted under 35 U.S.C. 154(b) by 0 days.

(21) Appl. No.: 16/242,100

(22) Filed: Jan. 8, 2019

(65) Prior Publication Data
US 2019/0210625 A1 Jul. 11, 2019

Related U.S. Application Data

(60) Provisional application No. 62/615,274, filed on Jan. 9, 2018.

(51) Int. Cl.
*B62B 5/06* (2006.01)
*B62B 3/14* (2006.01)

(52) U.S. Cl.
CPC ............ *B62B 5/061* (2013.01); *B62B 3/1404* (2013.01)

(58) Field of Classification Search
CPC ........... B62B 3/14; B62B 5/06; B62B 5/0006; B65D 7/20
See application file for complete search history.

(56) References Cited

U.S. PATENT DOCUMENTS

| | | | |
|---|---|---|---|
| 2,890,057 A | 6/1959 | Davis | |
| 2,906,542 A | 9/1959 | Hoedinghaus et al. | |
| 2,931,662 A | 4/1960 | Young | |
| 3,195,912 A * | 7/1965 | Howard | B62B 5/0006 280/33.992 |
| D283,264 S | 4/1986 | Levy-Joseph | |
| D294,419 S | 2/1988 | Rehrig | |
| 6,749,204 B2 | 6/2004 | Werner | |
| 7,063,337 B2 | 6/2006 | Russell et al. | |
| D530,478 S | 10/2006 | Splain et al. | |
| D546,021 S | 7/2007 | Splain et al. | |
| D550,423 S | 9/2007 | Splain et al. | |
| D556,413 S | 11/2007 | Splain et al. | |
| 7,384,049 B2 * | 6/2008 | Peota | B62B 3/144 280/33.992 |
| 7,416,194 B2 * | 8/2008 | Splain | B62B 3/12 280/33.991 |
| D591,474 S | 4/2009 | Peota et al. | |
| 7,600,763 B2 * | 10/2009 | Splain | B62B 3/12 280/33.991 |

(Continued)

*Primary Examiner* — Bryan A Evans
(74) *Attorney, Agent, or Firm* — Banner & Witcoff, Ltd.

(57) ABSTRACT

A shopping cart basket having a handle region located at the front or the sides of the shopping cart basket is disclosed. The forward handle region may have a plurality of openings along the front, corners, and sides to allow a customer to easily grip the shopping cart basket and guide the shopping cart. The shopping cart basket may be formed from a metallic wire portion and a non-metallic forward handle region, or in some embodiments, the shopping cart basket may be formed from a fully formed from a polymer material.

16 Claims, 13 Drawing Sheets

(56) References Cited

U.S. PATENT DOCUMENTS

| | | | |
|---|---|---|---|
| 7,766,347 B2 | 8/2010 | Ryan et al. | |
| 7,793,948 B2 * | 9/2010 | Splain | B62B 3/12 280/33.991 |
| D628,759 S | 12/2010 | Walter | |
| 7,959,166 B2 * | 6/2011 | Splain | B62B 3/12 280/33.991 |
| D644,810 S | 9/2011 | Peota et al. | |
| D646,041 S | 9/2011 | Berthiaume et al. | |
| 8,096,564 B2 * | 1/2012 | Berthiaume | B29C 45/1704 280/33.992 |
| 8,469,373 B2 * | 6/2013 | Berthiaume | B29C 45/1704 280/33.992 |
| 8,684,371 B2 * | 4/2014 | Berthiaume | B29C 45/1704 280/33.991 |
| D802,868 S | 11/2017 | Sherman et al. | |
| D802,869 S | 11/2017 | Sherman et al. | |
| D818,237 S | 5/2018 | Walter et al. | |
| D821,049 S | 6/2018 | Lazzarino et al. | |
| 2002/0135144 A1 | 9/2002 | Murar et al. | |
| 2003/0057666 A1 | 3/2003 | Murar et al. | |
| 2004/0046341 A1 | 3/2004 | Wilkinson | |
| 2007/0063461 A1 | 3/2007 | Peota et al. | |
| 2007/0063464 A1 * | 3/2007 | Splain | B62B 3/12 280/33.992 |
| 2009/0160146 A1 * | 6/2009 | Berthiaume | B29C 45/1704 280/33.992 |
| 2012/0304440 A1 * | 12/2012 | Berthiaume | B29C 45/1704 29/428 |
| 2013/0300076 A1 * | 11/2013 | Berthiaume | B29C 45/1704 280/33.997 |

\* cited by examiner

SHOPPING CART BASKET WITH FORWARD HANDLE

CROSS-REFERENCE TO RELATED APPLICATIONS

This application claims priority to U.S. Provisional Patent Application No. 62/615,274 filed on Jan. 9, 2018. The above referenced application is incorporated by reference in its entirety.

FIELD OF THE INVENTION

This disclosure relates to baskets for shopping carts for grocery stores and the like and shopping carts.

BACKGROUND

At present, the American-market, adult, full-size, wire-made shopping cart has a distinctive construction of a frame, casters, basket, hinged back gate and child seat.

The frame is composed of a chassis and a handle, made up of multiple, bent steel tubes, and sits atop four casters, the rear two of which track forward and back, and the front two of which swivel. A lower shelf of wire lies between the lower side rails of the chassis. The frame handle rises in the back from the chassis to form the "driver's" "steering mechanism." The basket is see-through and mounts atop the frame, forward of the handle. A hinged back gate with a folding child seat completes the basket and allows the carts to nest with each other in the manner familiar to all shoppers in stores with carts.

While the frame handle is mounted at the rear of the shopping cart, a means to allow the customer to easily grasp the shopping cart from the front to provide an alternate means of propelling the shopping cart would be helpful.

BRIEF SUMMARY

This disclosure may relate to a shopping cart comprising a frame including a rear handle and a chassis connected to four casters, a shopping cart basket attached to the frame, where the shopping cart basket comprises a front wall on a front end, a rear opening on a rear end opposite the front wall, a first side wall extending between the front wall and the rear end, a second side wall extending between the front wall and the rear end opposite the first side wall, and a bottom wall extending between the front wall, the first side wall, and the second side wall. The shopping cart basket may also include a lower portion of the shopping cart basket comprising a wire basket region formed from a metallic material and a forward handle region formed from a non-metallic material, where the forward handle region is positioned on top of the wire basket region and forms an upper portion of the shopping cart basket. The forward handle region may include a main body portion positioned along the front wall of the shopping cart basket, a first side arm that extends from the main body portion along the first side wall of the shopping cart basket, and a second side arm that extends from the main body portion along the second side wall of the shopping cart basket, where the main body portion includes a pair of front openings in the main body portion.

In other aspects, this disclosure may relate to a shopping cart basket where the forward handle region includes an upper surface that forms an uppermost surface of the shopping cart basket, and a lower surface that engages the wire basket region of the shopping cart, where the upper surface is spaced from the lower surface at the front end and where the upper surface and the lower surface converge toward each other along the first side arm. The forward handle region may include a groove that extends along the first side arm, along the main body portion, and along the second side arm between a lower surface and a top groove surface. The groove may be configured to receive a support rod to secure the shopping cart basket to the frame. Each front opening of the pair of front openings may be positioned between the upper surface and the top groove surface. The pair of front openings may comprise a first front opening and a second front opening are separated by a support rib that extends between the upper surface and the top groove surface, where the first front opening has a height between 30 mm and 60 mm. In some embodiments, the first front opening may have a length defined in a horizontal direction and a height defined in a vertical direction, where the first front opening has a ratio of a minimum length to a minimum height within a range of 1.8:1 and 3.4:1.

Still in other aspects, this disclosure may relate to a shopping cart basket where the forward handle region includes a first corner section located adjacent the main body portion where the first side arm extends from the main body portion, and a first corner opening within the first corner section between the upper surface and the top groove surface, where the first corner opening is separated from first front opening by a corner rib extending between the upper surface and the top groove surface. The first side arm of the forward handle region may extend a majority of a length of the first side wall of the shopping cart basket and the second side arm may extend a majority of a length of the second side wall of the shopping cart basket. In addition, the first side arm may include an elongated recess along an exterior side surface.

Other features of this disclosure may relate to a shopping cart comprising a frame including a rear handle and a chassis connected to four casters, a shopping cart basket attached to the frame, wherein the shopping cart basket comprises a lower basket portion including a front wall on a front end, an opening on a rear end opposite the front wall, a first side wall extending between the front wall and the rear end, a second side wall extending between the front wall and the rear end opposite the first side wall, and a bottom wall extending between the front wall, the first side wall, and the second side wall. The shopping cart basket may include a forward handle region forming an upper portion of the shopping cart basket, where the forward handle region may include a main body portion positioned along a top of the front wall of the shopping cart basket, a first side arm that extends from the main body portion along a top of the first side wall of the shopping cart basket, and a second side arm that extends from the main body portion along a top of the second side wall of the shopping cart basket. A groove may extend along the first side arm, along the main body portion, and along the second side arm, and the groove may be configured to receive a support rod to secure the shopping cart basket to the chassis of the shopping cart. The forward handle region may include an upper surface that forms an uppermost surface of the shopping cart basket, where the upper surface is spaced from a top groove surface of the groove at the front end, and where the upper surface and the top groove surface converge toward each other along the first side arm.

This disclosure may also relate to a shopping cart basket being formed from a polymer material and where a lower portion of the shopping cart basket has a honeycomb structure below the groove and the forward handle region. The first side arm may extend a majority of a length of the first side wall of the shopping cart basket, and the second side arm may extend a majority of a length of the second side wall of the shopping cart basket. The forward handle region may include a first front opening and a second front opening positioned between the upper surface and the top groove surface at the front end of the shopping cart basket, where the first front opening and the second front opening are separated by a support rib that extends between the upper surface and the top groove surface. The first front opening has a length defined in a horizontal direction and a height defined in a vertical direction, wherein the first front opening has a ratio of a minimum length to a minimum height within a range of 1.8:1. As another option, the first side arm includes an elongated recess along an exterior side surface.

Yet other aspects of this disclosure may relate to a shopping cart comprising a frame including a rear handle and a chassis connected to four casters, a shopping cart basket attached to the frame, where the shopping cart basket comprises a lower basket portion including a front wall on a front end, an opening on a rear end opposite the front wall, a first side wall extending between the front wall and the rear end, a second side wall extending between the front wall and the rear end opposite the first side wall, and a bottom wall extending between the front wall, the first side wall, and the second side wall. The shopping cart basket may also include a forward handle region forming an upper portion of the shopping cart basket, where the forward handle region may include a main body portion positioned along the front wall of the shopping cart basket, a first side arm that extends from the main body portion along a top of the first side wall of the shopping cart basket for a majority of a length of the first side wall, and a second side arm that extends from the main body portion along a top of the second side wall of the shopping cart basket for a majority of a length of the second side wall. A groove may extend along the first side arm, along the main body portion, and along the second side arm between a top groove surface and a lower portion of the shopping cart basket, where the groove may be configured to receive a support rod that secures the shopping cart basket to the chassis. The lower portion of the shopping cart basket may have a honeycomb structure. The forward handle region may include a first front opening and a second front opening positioned between an upper surface and a lower surface at the front end of the shopping cart basket, where the first front opening and the second front opening are separated by a support rib that extends between the upper surface and a top groove surface. The first front opening may have a length defined in a horizontal direction and a height defined in a vertical direction, where the first front opening has a ratio of a minimum length to a minimum height within a range of 1.8:1 and 3.4:1, and the second front opening may have a length defined in a horizontal direction and a height defined in a vertical direction, wherein the first front opening has a ratio of a minimum length to a minimum height within a range of 1.8:1 and 3.4:1. The forward handle region may include a first corner section located where the first side arm extends from the main body portion and a first corner opening between the upper surface and the top groove surface, where the first corner opening may be separated from first front opening by a corner rib extending between the upper surface and the top groove surface. The first side arm of the forward handle region may include an elongated recess along an exterior side surface.

BRIEF DESCRIPTION OF THE DRAWINGS

To allow for a more full understanding of the present disclosure, it will now be described by way of example, with reference to the accompanying drawings in which.

DETAILED DESCRIPTION

Figure 1:
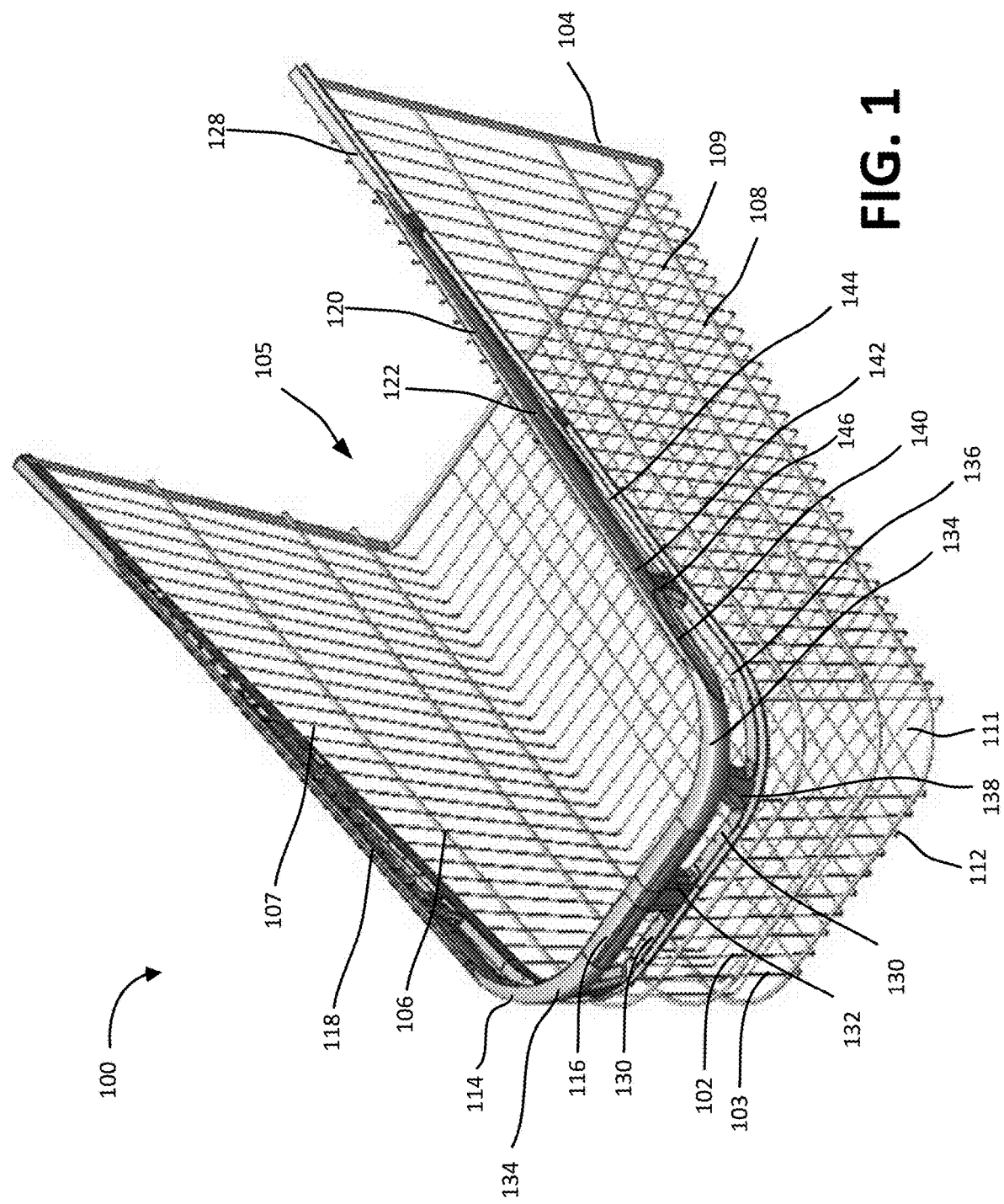
FIG. 1 is a top front perspective view of an embodiment of a shopping cart basket as disclosed herein.

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," "proximal," "distal," and the like may be used in this specification to describe various example features and elements of the invention, these terms are used herein as a matter of convenience, e.g., based on the example orientations shown in the figures or the orientation during typical use. Nothing in this specification should be construed as requiring a specific three-dimensional orientation of structures in order to fall within the scope of this invention, unless explicitly specified by the claims. Further, "providing" an article, as used herein, refers broadly to making an article available or accessible for future actions to be performed on the article, and does not connote that the party providing the article has manufactured, produced, or supplied the article or that the party providing the article has ownership or control of the article. The reader is also advised that the attached drawings are not necessarily drawn to scale.

In general, this disclosure relates to a shopping cart basket having a forward handle region to allow a customer to easily grip and pull a shopping cart.

FIGS. 1-7 illustrate an embodiment of a shopping cart basket 100 having a hybrid type construction meaning that the shopping cart basket 100 may be made from multiple components such as having a wire basket region 112 formed from a metallic component that forms the lower portion of the shopping cart basket 100 and a forward handle region 114 formed from a non-metallic or polymer component that forms the upper portion of the shopping cart basket 100. The shopping cart basket 100 comprises a front side or front end 102, a rear side or rear end 104 opposite the front end 102, a left side 106, a right side 108, and a bottom side 110. The shopping cart basket may include a front wall 103 on the front end 102, a rear opening 105 on the rear end 104 opposite the front wall 103, a left side wall 107 extending between the front wall 103 and the rear end 104, a right side wall 109 extending between the front wall 103 and the rear end 104 opposite the left side wall 107, and a bottom wall 111 extending between the front wall 103, the left side wall 107, and the right side wall 109. The handle region 114 may comprise a main body portion 116 positioned along the top of the front side 102 of the basket 100 with a pair of arms 118, 120 extending from each end of the main body portion 116 and extending along the top of both the left side 106 and the right side 108 of the shopping cart basket 100. Each of the arms 118, 120 may extend up the entire length of the left side 106 and right side 108 respectively of the shopping cart basket 100. Alternatively, each of the arms 118, 120 may extend up the majority of the length of the left side 106 and right side 108 respectively of the shopping cart basket 100. In addition, the forward handle region 114 may be symmetrical around a plane extending in a vertical direction through a midpoint of the main body portion 116.

Figure 2:
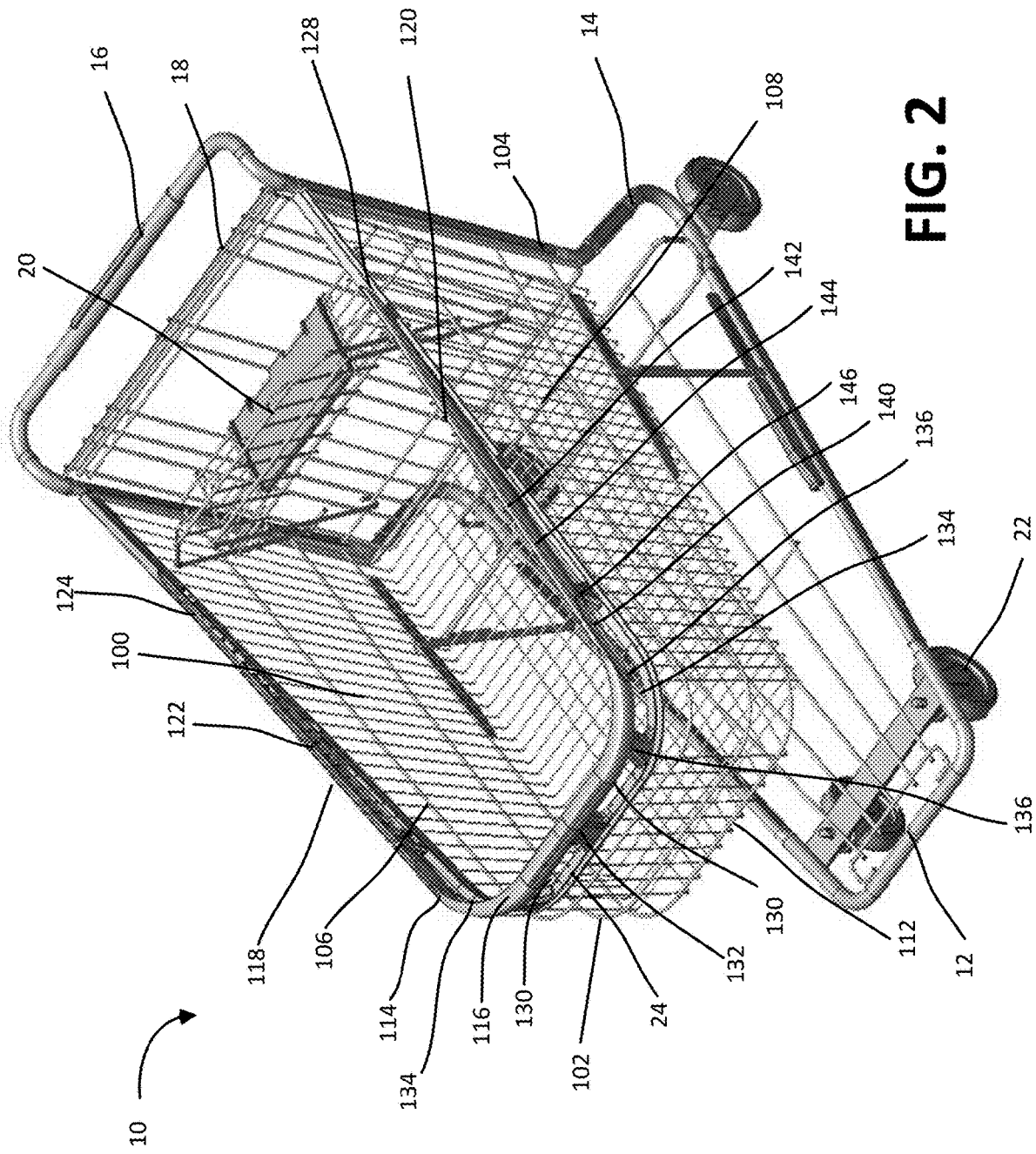
FIG. 2 is a top front perspective view of an embodiment of a shopping cart having a shopping cart basket shown in FIG. 1 as disclosed herein.
Figure 3:
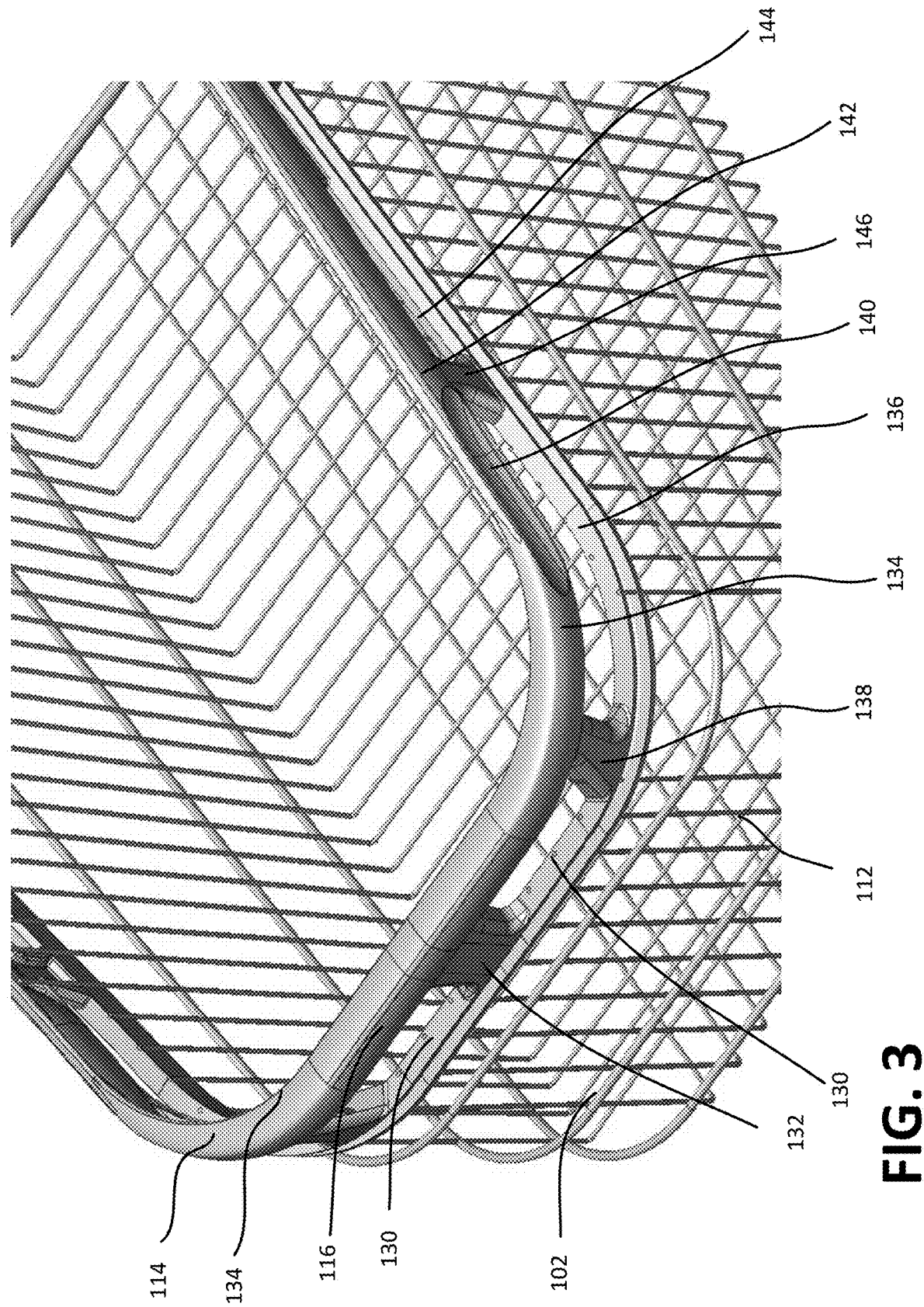
FIG. 3 is an enlarged view of the front portion of the perspective view of the shopping cart basket shown in FIG. 1.
Figure 4:
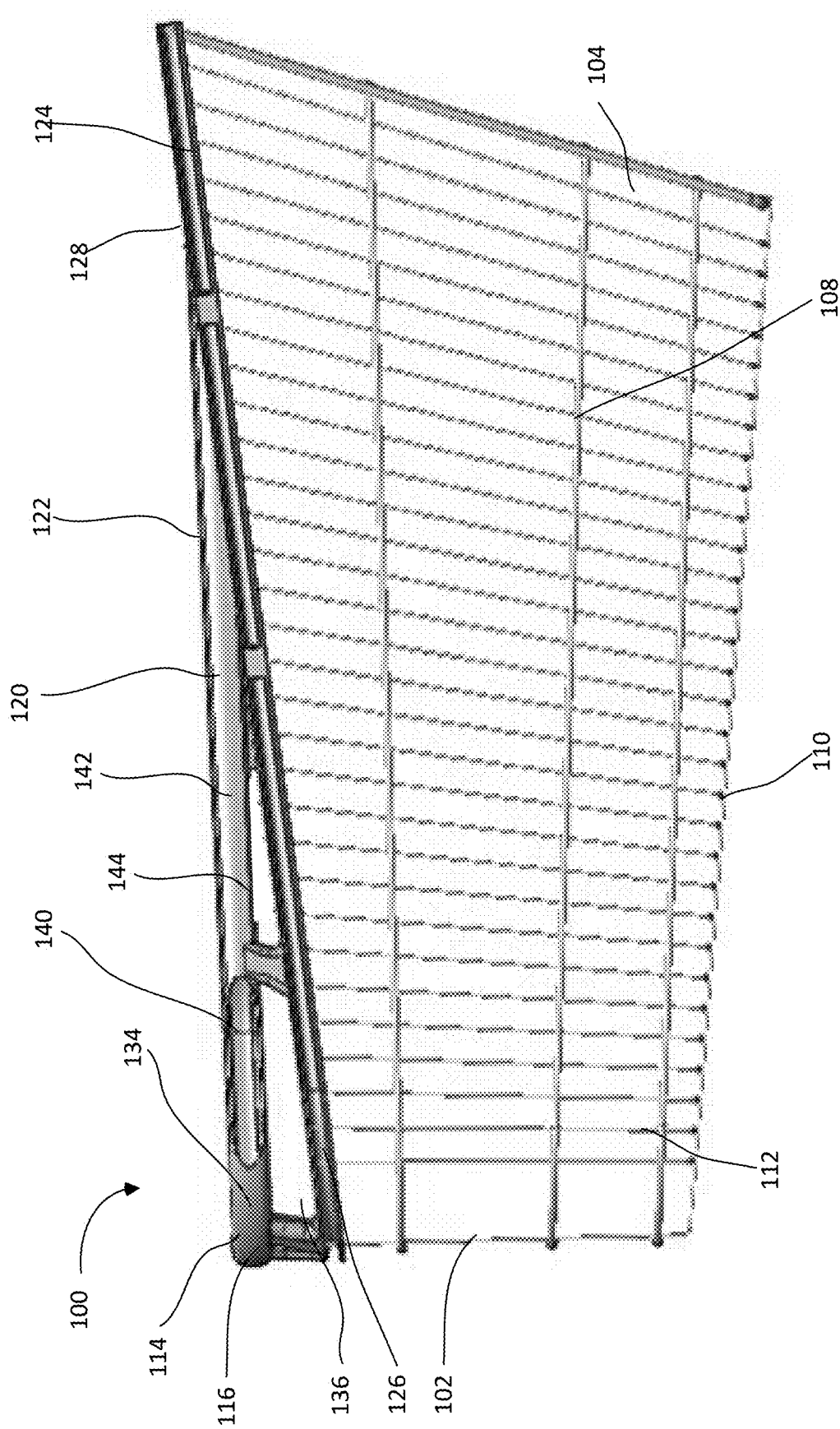
FIG. 4 is a side view of the shopping cart basket of the embodiment shown in FIG. 1 as disclosed herein.
Figure 5:
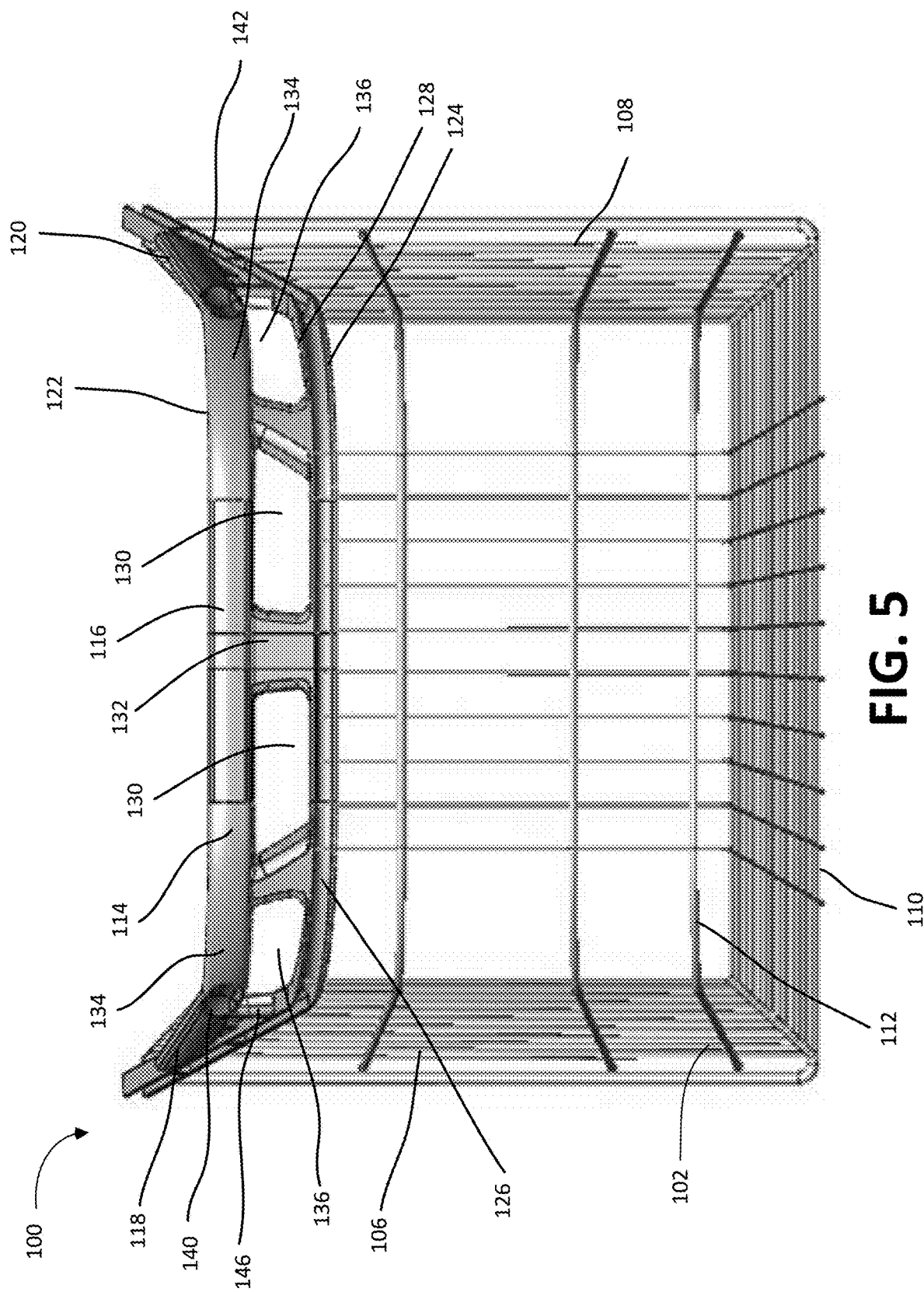
FIG. 5 is front view of the shopping cart basket of the embodiment shown in FIG. 1 as disclosed herein.

FIG. 2 illustrates a shopping cart 10 with the shopping cart basket 100 installed on a frame 12 that is comprised of a chassis 14 and a handle 16, where the chassis sits atop four casters 22. A hinged back gate 18 with a folding child seat 20 complete the shopping cart 10 and allows the carts to nest with each other in the manner familiar to all shoppers in stores with shopping carts 10.

The forward handle region 114 may include an upper surface 122 that forms the overall upper surface of the shopping cart basket 100. In addition, the handle region 114 may include a lower surface 124 that engages and secures the handle region 114 to a top of the wire basket region 112. In addition, a groove 126 may extend along an entire length of the handle region 114, where the groove 126 extends along from an end of arm 118 near the rear side 104 to the front side 102 along the main body portion 116 and then along the arm 120 back towards the rear side 104. The groove 126 may be positioned between the lower surface 124 and a top groove surface 128. The groove 126 may be configured to receive and secure a support rod 24 that helps to secure the shopping cart basket 100 to the chassis 14 of the shopping cart 10 and to enhance the durability of the shopping cart basket 100. The upper surface 122 and the lower surface 124 may converge toward each other and form an acute angle along each arm 118, 120.

The handle region 114 may be removably or permanently joined to the wire basket region 112. For example, the handle region 114 may be removably connected to the wire basket region 112 using mechanical fasteners, such as screws or multiple snap fit connections. Alternatively, the handle region 114 may be permanently joined to the wire basket region 112 using an adhesive, a mechanical swaging technique, or by molding the handle region 114 onto the wire basket region 112.

The handle region 114 may further comprise at least one front opening 130 or as in the embodiment shown in FIGS. 1-7, a plurality of front openings 130 extending through the main body portion 116. The front openings 130 may be positioned 136 may be located between the upper surface 122 and the top groove surface 128, or more specifically between the handle surface 123 and the top groove surface 128. The handle surface 123 may be spaced downward from the upper surface 122 toward the lower surface 124. Additionally, the handle surface 123 may be spaced a constant distance from the upper surface 122 from the main body portion 116. The plurality of front openings 130 may be substantially trapezoidal in shape, although they may be any shape such as rectangular or elliptical. In addition, the front openings 130 may be tapered where the front portion of the opening is wider than the rear portion of the front openings 130. The front openings 130 may be separated from each other by a forward support rib 132 that connects the upper surface 122 to the top groove surface 128. The forward support rib 132 may extend from the handle surface 123 to the top groove surface 128. The forward support rib 132 may be centrally located along the front side 102 of the shopping cart basket 100. Each of the front openings 130 may be sized such that a customer may extend a portion of their hand through either of the front openings 130 to pull the shopping cart 10 in their desired direction. Each front opening 130 may be sized to have a length measured horizontally of at least 80 mm, or within a range of 80 mm and 140 mm, or within a range of 90 mm and 130 mm. In addition, each of the front openings 130 may have a height measured vertically of at least 30 mm, or within a range of 30 mm and 60 mm, or within a range of 38 mm and 50 mm. As another way of describing the front openings 130, the size of the front openings 130 may have a ratio of the minimum horizontal length to the minimum vertical height within a range of 1.3:1 to 4.6:1, or within a range of 1.8:1 to 3.4:1, or within a range of 2.3:1 to 2.7:1. The minimum horizontal length may be defined as the minimum distance between a corner rib 138 and the forward support rib 132. The minimum height may be defined as the minimum distance between the handle surface 123 and the top groove surface 128.

In addition, a corner section 134 of the handle region 114 may be defined as the section where each of the arms 118, 120 extend from the main body portion 116. Each corner section 134 may have a substantial radius that joins the main body portion 116 to each of the arms 118, 120. Also, each corner section 134 may have a corner opening 136 that extends from the front side 102 towards the rear side 104 and either of the sides 106, 108. The corner openings 136 may be located between the upper surface 122 and the top groove surface 128, or more specifically between the handle surface 123 and the top groove surface 128. The corner openings 136 may also be substantially trapezoidal in shape, although they may be any shape such as rectangular or elliptical. In addition, each corner opening 136 may be separated from a front opening 130 by a corner rib 138 that connects the upper surface 122 to the top groove surface 128. Each corner rib 138 may extend from the handle surface 123 to the top groove surface 128. Each of the corner openings 136 may be sized such that a customer may extend a portion of their hand through either of the corner openings 136 to pull the shopping cart 10 in their desired direction. Each corner opening 136 may have a horizontal length of at least 160 mm, or within a range of 160 mm and 220 mm, or within a range of 170 mm and 200 mm, and may have a vertical height of at least 20 mm, or within a range of 20 mm and 45 mm, or within a range of 15 mm and 50 mm. As another way of describing the corner openings 136, the size of the corner openings 136 may have a ratio of the minimum horizontal length to the minimum vertical height within a range of 3.4:1 to 13.3:1, or within a range of 4.0:1 to 11.3:1, or within a range of 4.9:1 to 8:1. The minimum horizontal length may be defined as the minimum distance between a corner rib 138 and the side rib 146. The minimum height may be defined as the minimum distance between the handle surface 123 and the top groove surface 128.

Each arm 118, 120 may further comprise a recess 140 where the recess 140 is positioned along an exterior side surface 142 of each arm 118, 120. The recess 140 may provide another location for a customer to grasp on the shopping cart 10. At least a portion of each recess 140 may be positioned above each of the corresponding corner openings 136 and may have a length that is less than the length of the corner opening 136. The recess 140 may have a length of at least 130 mm. The recess 140 may be elongated and generally elliptical in shape and include a smooth rounded concave lower surface.

Additionally, each arm 118, 120 may include a side opening 144 spaced rearward and separated from the corner opening 136 by a side rib 146. Each side opening 144 may be generally triangular in shape and have a maximum height of at least 20 mm. In addition, the handle region 114 may have smooth rounded exterior surfaces adjacent and along the edges of the openings to provide a comfortable surface for the customer to grasp.

Figure 6:
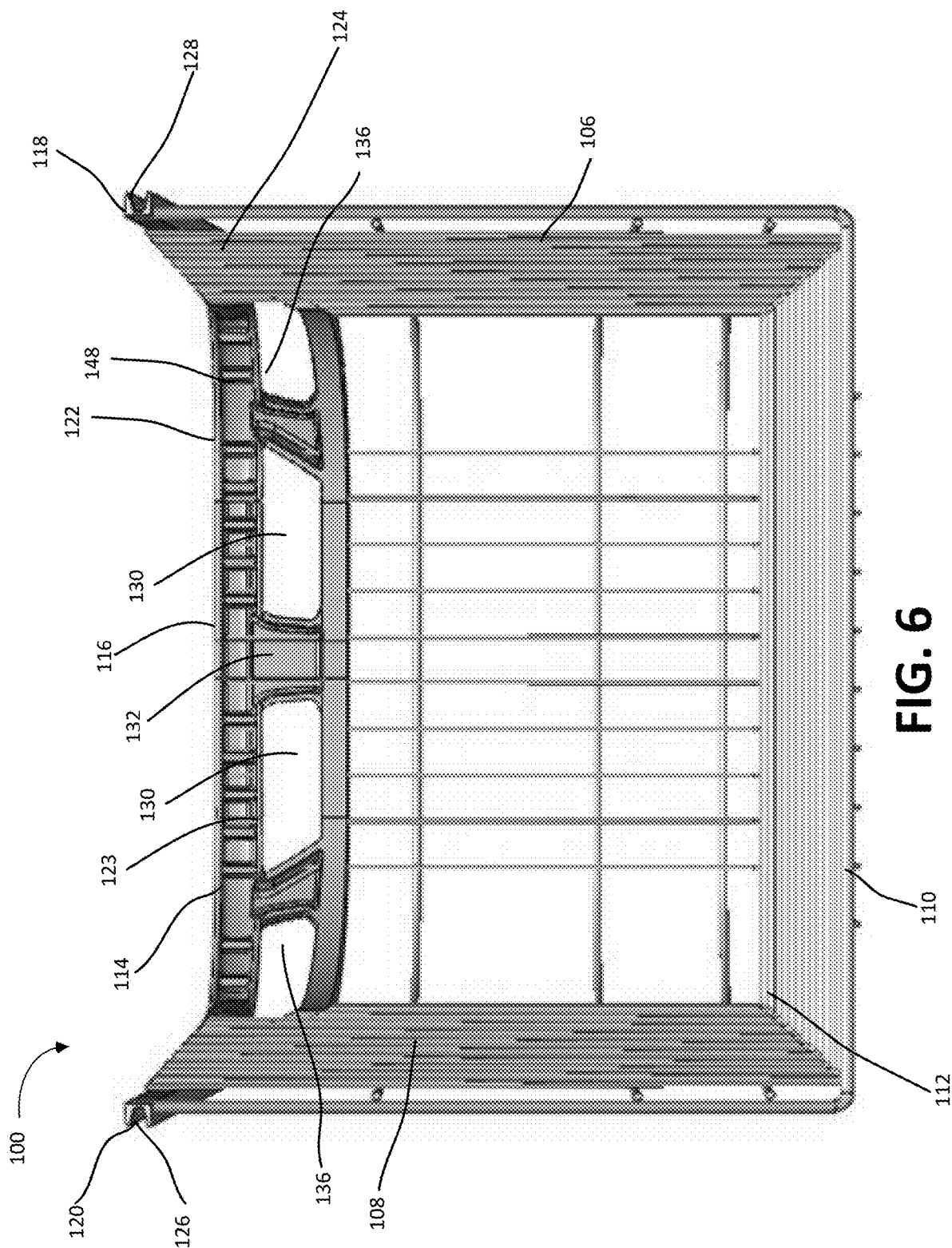
FIG. 6 is rear view of the shopping cart basket of the embodiment shown in FIG. 1 as disclosed herein.
Figure 7:
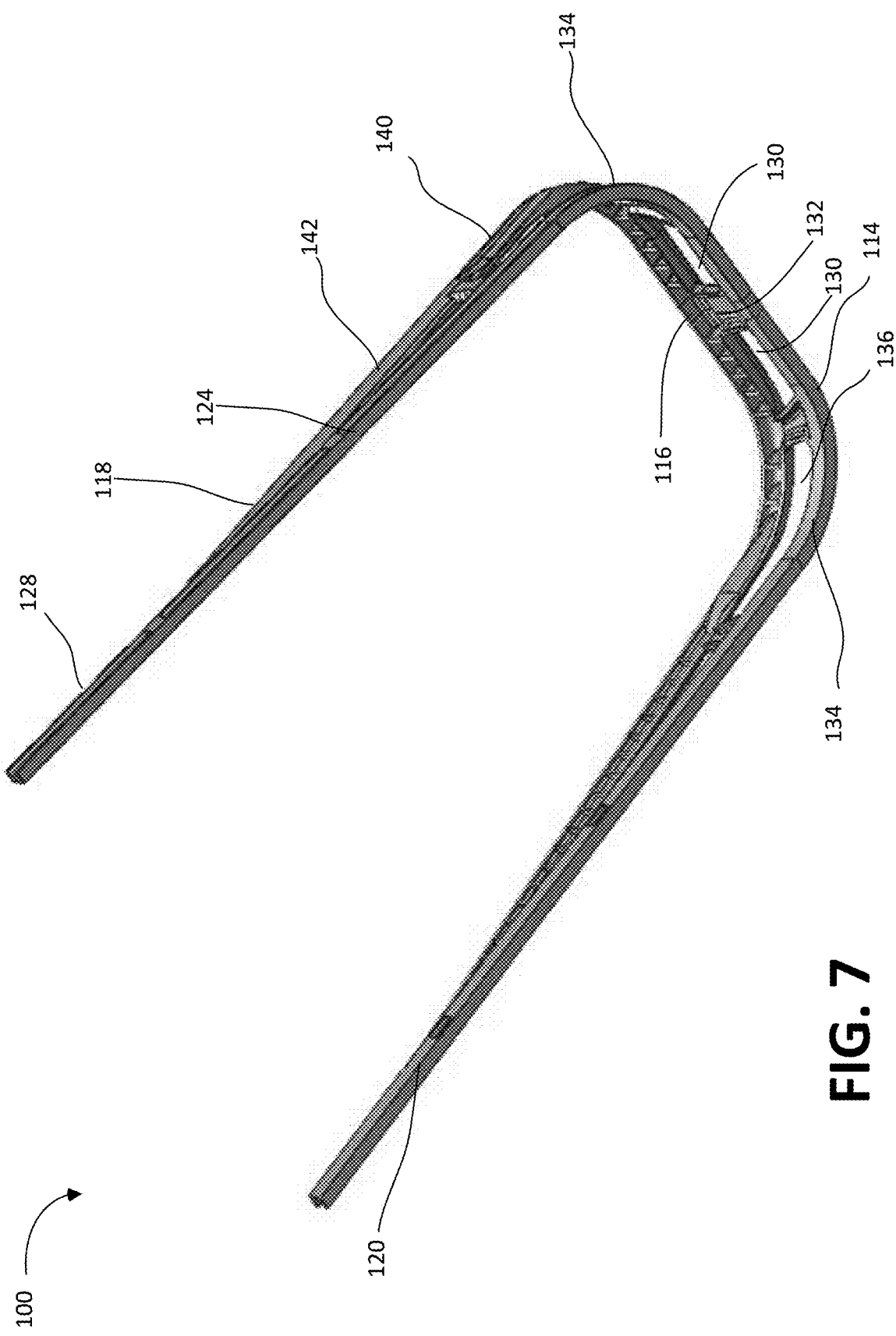
FIG. 7 is a bottom back perspective view of a handle region of the shopping cart basket as disclosed herein with the wire portion of the shopping cart basket removed.
Figure 8:
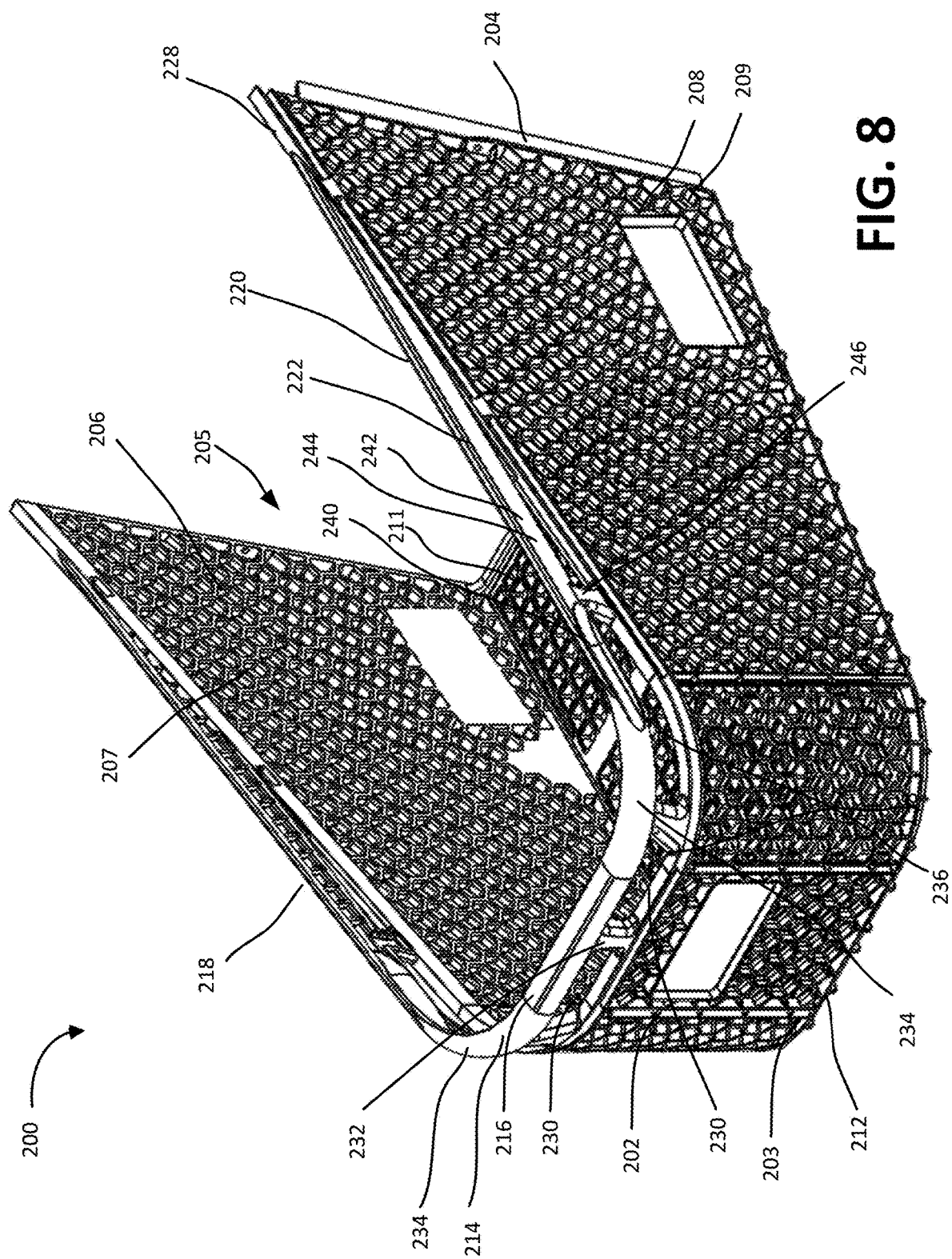
FIG. 8 is a top front perspective view of an alternate embodiment of a shopping cart basket as disclosed herein.
Figure 9:
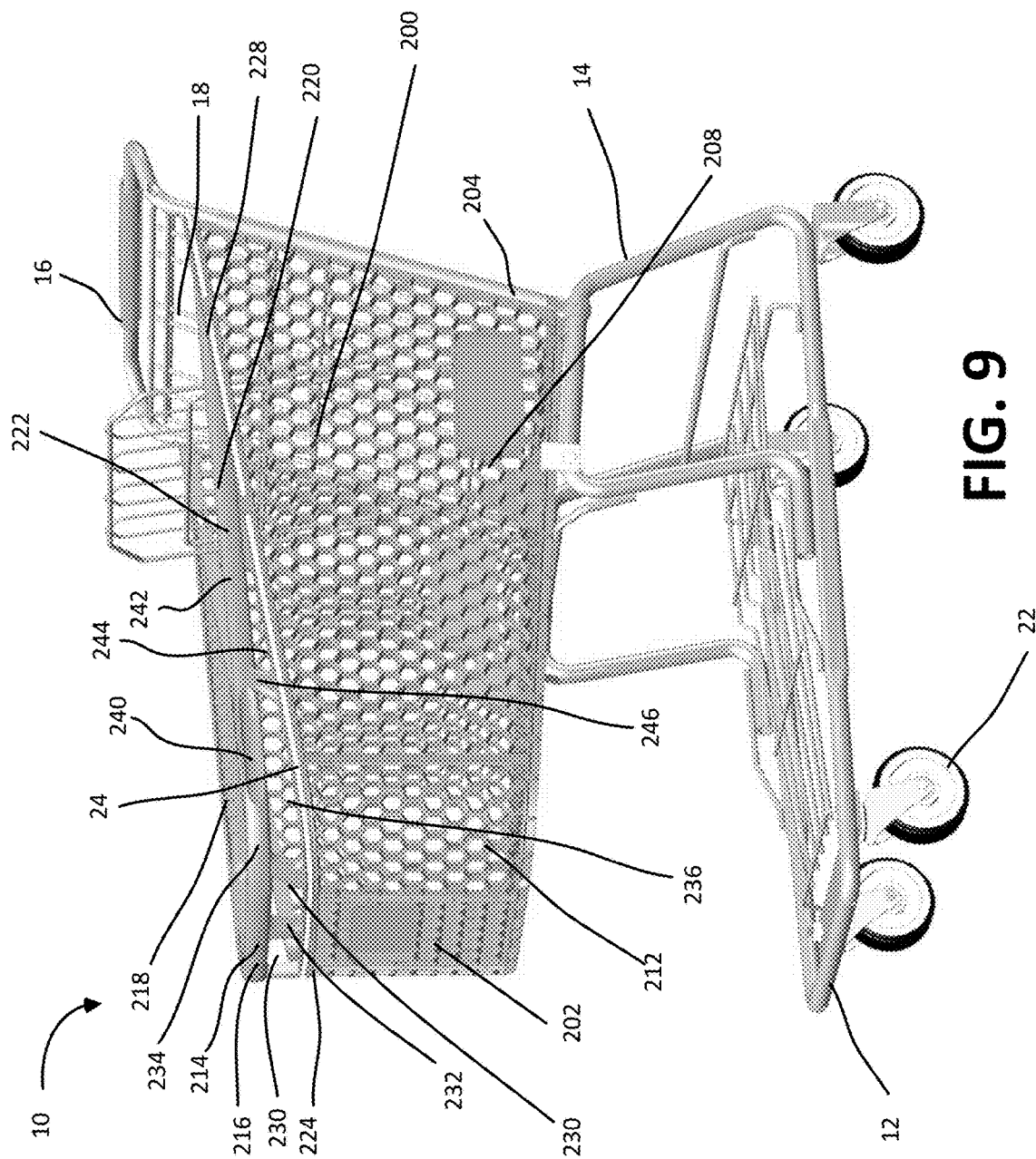
FIG. 9 is a top front perspective view of an embodiment of a shopping cart having a shopping cart basket as shown in FIG. 8 as disclosed herein.
Figure 10:
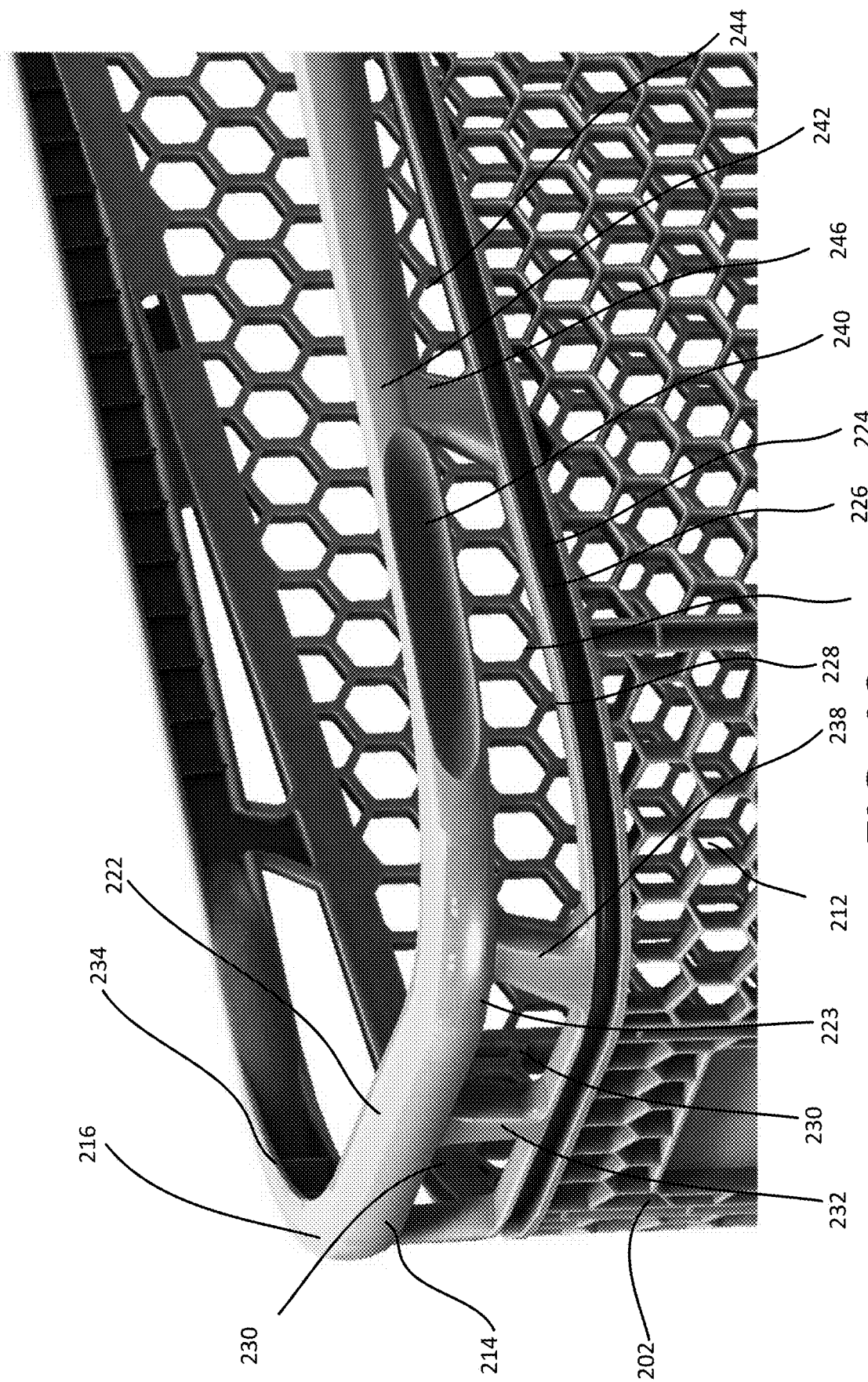
FIG. 10 is an enlarged view of the front portion of the perspective view of the shopping cart basket shown in FIG. 8 as disclosed herein.
Figure 11:
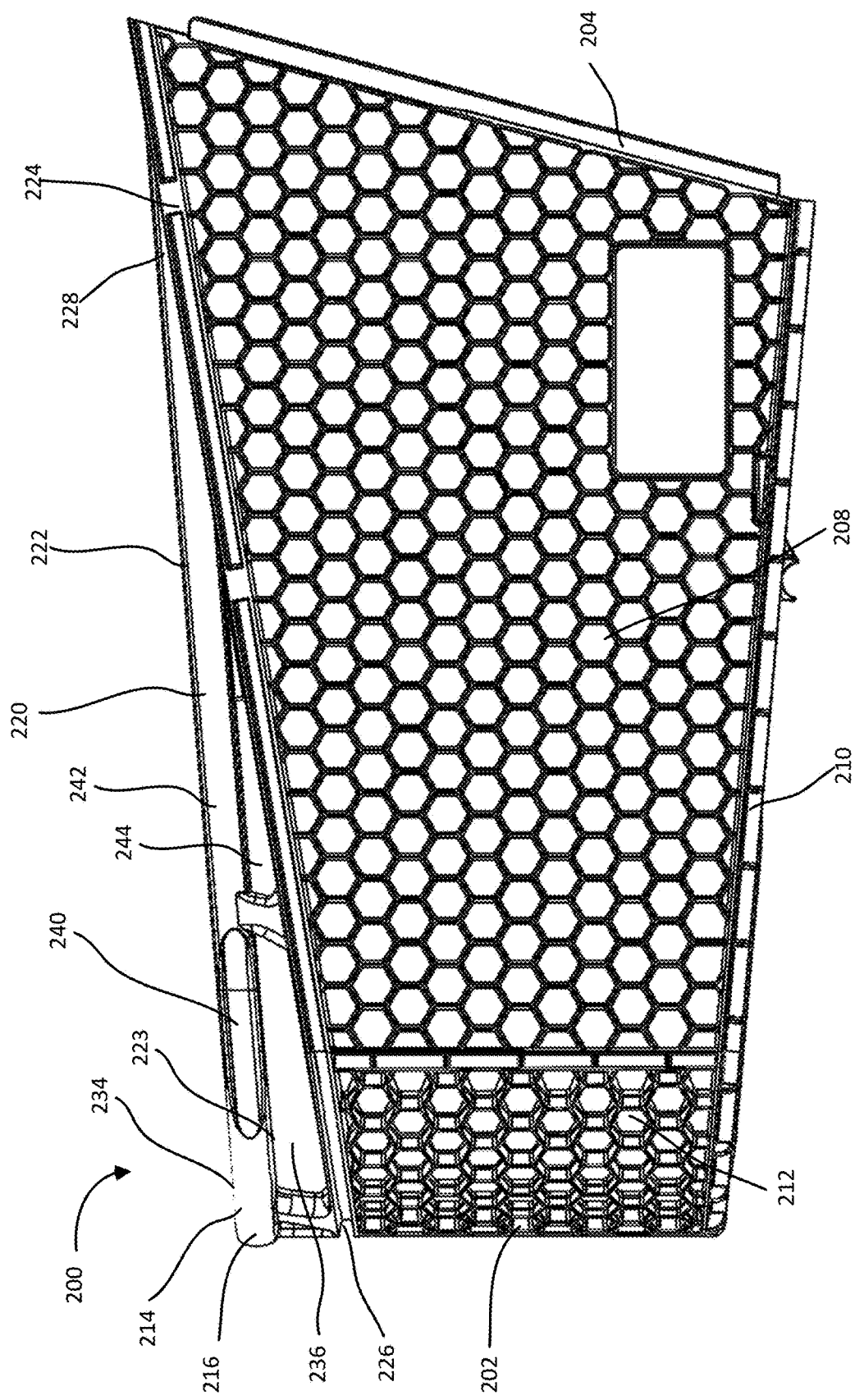
FIG. 11 is a side view of the shopping cart basket of the embodiment shown in FIG. 8 as disclosed herein.
Figure 12:
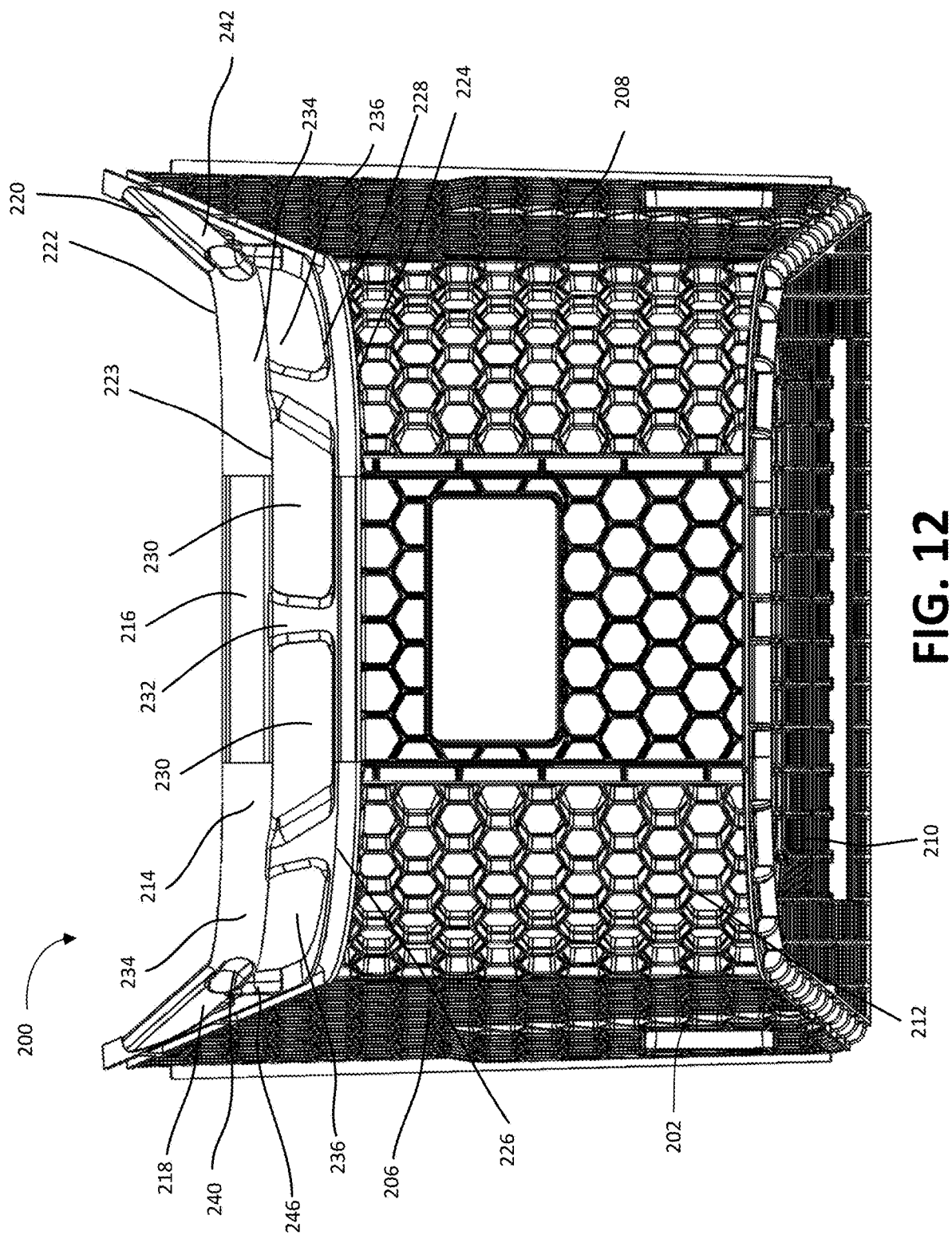
FIG. 12 is front view of the shopping cart basket of the embodiment shown in FIG. 8 as disclosed herein.

As shown in FIGS. 6 and 7, a plurality of interior ribs 148 may be present between the upper surface 122 and the handle surface 123 of the front openings 130, the corner openings 136, and the side openings 144. These interior ribs 148 allow the handle region 114 to be lightweight and still provide the structural strength for durability of the shopping cart basket 100.

As discussed above, the handle region 114 may be formed of a polymer material, such as nylon, polycarbonate, or other rigid polymer. The polymer material may be fiber filled or unfilled. Further, the handle region 114 may be formed from a molding process such as injection or rotational molding.

The wire basket region 112 may be formed from a plurality of individual wires oriented horizontally and vertically that cross at right angle forming a mesh. The mesh is permanently joined as known to own skilled in the art.

FIGS. 8-13 illustrate an alternate embodiment of shopping cart basket 200, where the shopping cart basket is made of polymer material. For embodiment of FIGS. 8-13, the features are referred to using similar reference numerals under the "2xx" series of reference numerals, rather than "1xx" as used in the embodiment of FIGS. 1-7. Accordingly, certain features of the shopping cart basket 200 that were already described above with respect to shopping cart basket 100 of FIGS. 1-7 may be described in lesser detail, or may not be described at all. Shopping cart basket 200 may be formed as a single integral piece such that the handle region 214 is formed with the lower basket portion 212. The lower basket portion 212 may generally have a honeycomb structure formed from a plurality of nested hexagonal shaped walls, where the honeycomb structure includes a plurality of visible openings.

The handle region 214 may have a similar structure described above with respect to the handle region 114 described above. The handle region 214 may further comprise at least one front opening 230 or as in the embodiment shown in FIGS. 8-13, a plurality of front openings 230. The front openings 230 may be positioned between the top groove surface 228 and a handle surface 223 spaced downward from the upper surface 222 toward the lower surface 224. The handle surface 223 may be spaced a constant distance from the upper surface 222 along the main body portion 216. The plurality of front openings 230 may be separated from each other by a forward support rib 232 that connects the upper surface 222 to the top groove surface 228. The forward support rib 132 may extend from the handle surface 223 to the top groove surface 228. Each of the front openings 230 may be sized such that a customer may extend a portion of their hand through either of the front openings 230 to pull the shopping cart 10 in their desired direction. Each front opening 230 may be sized to have a length measured horizontally of at least 80 mm, or within a range of 80 mm and 140 mm, or within a range of 90 mm and 130 mm. In addition, each of the front openings 230 may have a height measured vertically of at least 30 mm, or within a range of 30 mm and 60 mm, or within a range of 38 mm and 50 mm. As another way of describing the front openings 230, the size of the front openings 230 may have a ratio of the minimum horizontal length to the minimum vertical height within a range of 1.3:1 to 4.6:1, or within a range of 1.8:1 to 3.4:1, or within a range of 2.3:1 to 2.7:1. The minimum horizontal length may be defined as the minimum distance between a corner rib 238 and the forward support rib 232. The minimum height may be defined as the minimum distance between the handle surface 223 and the top groove surface 228.

In addition, a corner section 234 of the handle region 214 may be defined as the section where each of the arms 218, 220 extend from the main body portion 216. Each corner section 234 may have a substantial radius that joins the main body portion 216 to each of the arms 218, 220. Also, each corner section 234 may have a corner opening 236 that extends from where the front side 202 towards the rear side 204 and either of the sides 206, 208. The corner openings 236 may be separated from a front opening 130 by a corner rib 238 that connects the upper surface 222 to the top groove surface 228. Each corner rib 238 may extend from the handle surface 223 to the top groove surface 228. Each of the corner openings 236 may be sized such that a customer may extend a portion of their hand through either of the corner openings 236 to pull the shopping cart 10 in their desired direction. Each corner opening 236 may have a horizontal length of at least 160 mm, or within a range of 160 mm and 220 mm, or within a range of 170 mm and 200 mm, and may have a vertical height of at least 20 mm, or within a range of 20 mm and 45 mm, or within a range of 15 mm and 50 mm. As another way of describing the corner openings 236, the size of the corner openings 236 may have a ratio of the minimum horizontal length to the minimum vertical height within a range of 3.4:1 to 13.3:1, or within a range of 4.0:1 to 11.3:1, or within a range of 4.9:1 to 8:1. The minimum horizontal length may be defined as the minimum distance between a corner rib 238 and the side rib 246. The minimum height may be defined as the minimum distance between the handle surface 223 and the top groove surface 228.

Each arm 218, 220 may further comprise a recess 240 where at least a portion of the recess 240 is positioned along an exterior side surface 242 of each arm 218, 220. The recess 240 may provide another location for a customer to grasp on the shopping cart 10. At least a portion of each recess 240 may be positioned above each of the corresponding corner openings 236 and may have a length that is less than the length of the corner opening 236. The recess 240 may have a length of at least 130 mm. The recess 240 may be elongated in shape and include a smooth rounded concave lower surface.

Figure 13:
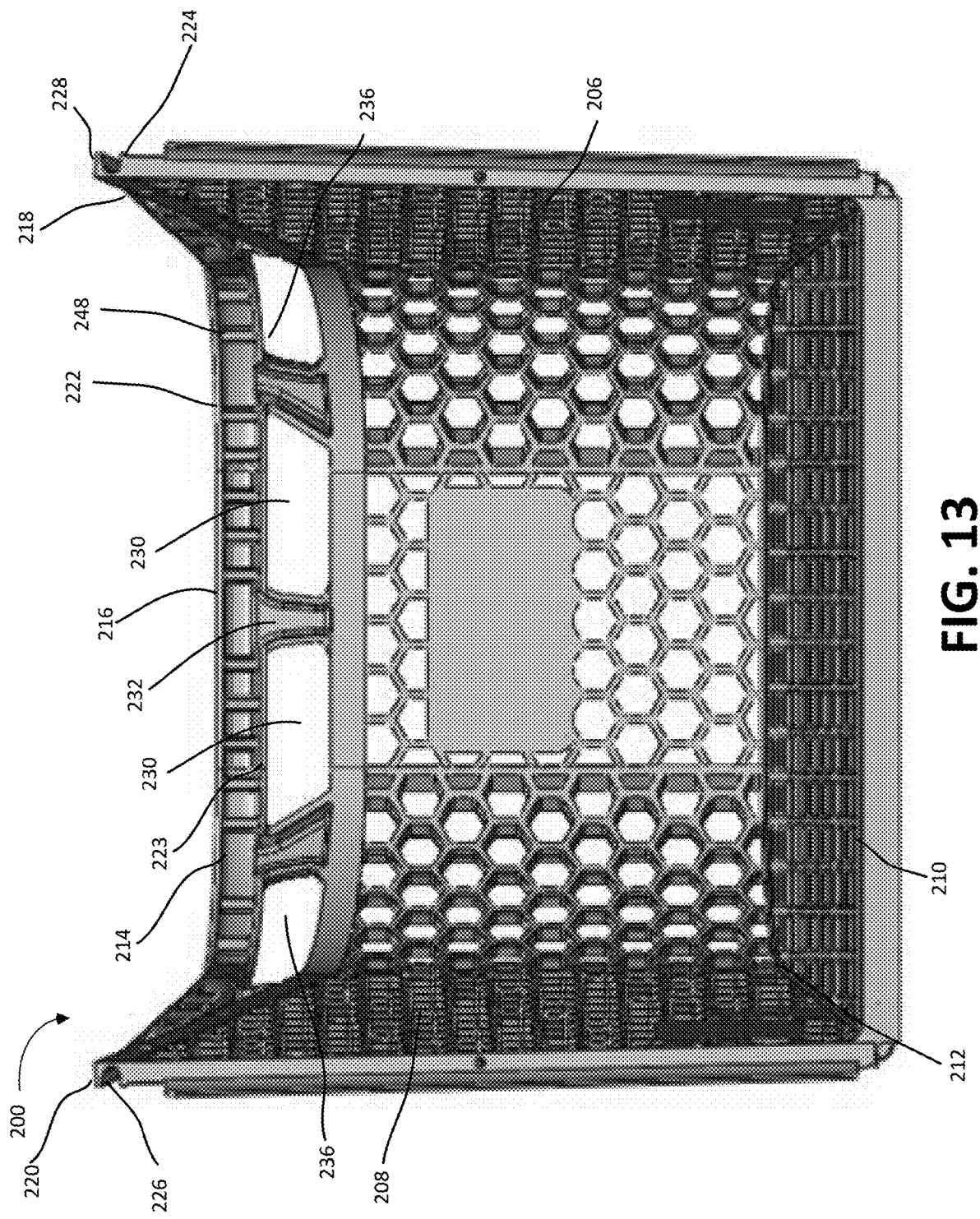
FIG. 13 is rear view of the shopping cart basket of the embodiment shown in FIG. 8 as disclosed herein.

Additionally, each arm 218, 220 may also include a side opening 244 spaced rearward and separated from a side rib 246. In addition, as shown in FIG. 13, the a plurality of interior ribs 248 may be present between the upper surface 222 and the upper surfaces of the front openings 230, the corner openings 236, and the side openings 244. These interior ribs 248 allow the handle region 214 to be lightweight and still provide the structural strength for durability of the shopping cart basket 200.

The shopping cart basket 200 may be formed from a polymer material, such as nylon, polycarbonate, or other rigid polymer. The polymer material may be fiber filled or unfilled. Further, the shopping cart basket 200 may be formed from multiple components that are formed and then joined together or formed as a single integral piece. In addition, the shopping cart basket 200 may be formed from a molding process such as injection or rotational molding.

As another alternative option of both shopping cart baskets 100 and 200, the handle regions 114, 214 of each configuration may be without either or both of the front openings 130, 230, either or both of the corner openings 136, 236, and either or both of the side openings 144, 244.

While the invention has been described with respect to specific examples including presently preferred modes of carrying out the invention, those skilled in the art will appreciate that there are numerous variations and permutations of the above described systems and methods. Thus, the spirit and scope of the invention should be construed broadly as set forth in the appended claims.

What is claimed is:

1. A shopping cart comprising:
a frame including a rear handle and a chassis connected to four casters,
a shopping cart basket attached to the frame, wherein the shopping cart basket comprises a front wall on a front end, a rear opening on a rear end opposite the front wall, a first side wall extending between the front wall and the rear end, a second side wall extending between the front wall and the rear end opposite the first side wall, and a bottom wall extending between the front wall, the first side wall, and the second side wall,
wherein the shopping cart basket includes a lower portion of the shopping cart basket comprising a wire basket region formed from a metallic material, and a forward handle region formed from a non-metallic material, wherein the forward handle region is positioned on top of the wire basket region and forms an upper portion of the shopping cart basket,
wherein the forward handle region includes a main body portion positioned along the front wall of the shopping cart basket, a first side arm that extends from the main body portion along the first side wall of the shopping cart basket, and a second side arm that extends from the main body portion along the second side wall of the shopping cart basket, and wherein the main body portion includes a pair of front openings,
wherein the forward handle region includes an upper surface that forms an uppermost surface of the shopping cart basket, and a lower surface that engages the wire basket region of the shopping cart, wherein the upper surface is spaced from the lower surface at the front end, and wherein the upper surface and the lower surface converge toward each other along the first side arm,
wherein a groove extends along the first side arm, along the main body portion, and along the second side arm between a lower surface and a top groove surface, wherein the groove is configured to receive a support rod to secure the shopping cart basket to the frame, and
wherein each front opening of the pair of front openings are positioned between the upper surface and the top groove surface.

2. The shopping cart of claim 1, wherein the pair of front openings comprises a first front opening and a second front opening, and wherein the first front opening and the second front opening are separated by a centrally located support rib that extends between the upper surface and the top groove surface.

3. The shopping cart of claim 2, wherein the first front opening has a height between 30 mm and 60 mm.

4. The shopping cart of claim 2, wherein the first front opening has a length defined in a horizontal direction and a height defined in a vertical direction, wherein the first front opening has a ratio of a minimum length to a minimum height within a range of 1.8:1 and 3.4:1.

5. The shopping cart of claim 2, wherein the forward handle region includes a first corner section located adjacent the main body portion where the first side arm extends from the main body portion, and a first corner opening within the first corner section between the upper surface and the top groove surface, and wherein the first corner opening is separated from the first front opening by a corner rib extending between the upper surface and the top groove surface.

6. The shopping cart of claim 1, wherein the first side arm extends a majority of a length of the first side wall of the shopping cart basket, and wherein the second side arm extends a majority of a length of the second side wall of the shopping cart basket.

7. A shopping cart comprising:
a frame including a rear handle and a chassis connected to four casters,
a shopping cart basket attached to the frame, wherein the shopping cart basket comprises a front wall on a front end, a rear opening on a rear end opposite the front wall, a first side wall extending between the front wall and the rear end, a second side wall extending between the front wall and the rear end opposite the first side wall, and a bottom wall extending between the front wall, the first side wall, and the second side wall,
wherein the shopping cart basket includes a lower portion of the shopping cart basket comprising a wire basket region formed from a metallic material, and a forward handle region formed from a non-metallic material, wherein the forward handle region is positioned on top of the wire basket region and forms an upper portion of the shopping cart basket,
wherein the forward handle region includes a main body portion positioned along the front wall of the shopping cart basket, a first side arm that extends from the main body portion along the first side wall of the shopping cart basket, and a second side arm that extends from the main body portion along the second side wall of the shopping cart basket, and wherein the main body portion includes a pair of front openings, and
wherein the first side arm includes an elongated recess along an exterior side surface.

8. A shopping cart comprising:
a frame including a rear handle and a chassis connected to four casters, a shopping cart basket attached to the frame, wherein the shopping cart basket comprises a lower basket portion including a front wall on a front end, an opening on a rear end opposite the front wall, a first side wall extending between the front wall and the rear end, a second side wall extending between the front wall and the rear end opposite the first side wall, and a bottom wall extending between the front wall, the first side wall, and the second side wall, a forward handle region forming an upper portion of the shopping cart basket, wherein the forward handle region includes a main body portion positioned along a top of the front wall of the shopping cart basket, a first side arm that extends from the main body portion along a top of the first side wall of the shopping cart basket, and a second side arm that extends from the main body portion along a top of the second side wall of the shopping cart basket, and a groove that extends along the first side arm, along the main body portion, and along the second side arm, and wherein the groove is configured to receive a support rod that secures to the shopping cart basket to the chassis of the shopping cart, wherein the forward handle region includes an upper surface that forms an uppermost surface of the shopping cart basket, wherein the upper surface is spaced from a top groove surface of the groove at the front end, and wherein the upper surface and the top groove surface converge toward each other along the first side arm, and wherein the first side arm includes an elongated recess along an exterior side surface.

9. The shopping cart of claim 8, wherein the shopping cart basket is formed from a polymer material.

10. The shopping cart of claim 8, wherein the first side arm extends a majority of a length of the first side wall of the shopping cart basket, and wherein the second side arm extends a majority of a length of the second side wall of the shopping cart basket.

11. The shopping cart of claim 8, wherein a lower portion of the shopping cart basket has a honeycomb structure below the groove.

12. A shopping cart comprising:

a frame including a rear handle and a chassis connected to four casters, a shopping cart basket attached to the frame, wherein the shopping cart basket comprises a lower basket portion including a front wall on a front end, an opening on a rear end opposite the front wall, a first side wall extending between the front wall and the rear end, a second side wall extending between the front wall and the rear end opposite the first side wall, and a bottom wall extending between the front wall, the first side wall, and the second side wall, a forward handle region forming an upper portion of the shopping cart basket, wherein the forward handle region includes a main body portion positioned along a top of the front wall of the shopping cart basket, a first side arm that extends from the main body portion along a top of the first side wall of the shopping cart basket, and a second side arm that extends from the main body portion along a top of the second side wall of the shopping cart basket, and a groove that extends along the first side arm, along the main body portion, and along the second side arm, and wherein the groove is configured to receive a support rod that secures to the shopping cart basket to the chassis of the shopping cart, wherein the forward handle region includes an upper surface that forms an uppermost surface of the shopping cart basket, wherein the upper surface is spaced from a top groove surface of the groove at the front end, and wherein the upper surface and the top groove surface converge toward each other along the first side arm, and wherein the forward handle region includes a first front opening and a second front opening positioned between the upper surface and the top groove surface at the front end of the shopping cart basket, and wherein the first front opening and the second front opening are separated by a support rib that extends between the upper surface and the top groove surface.

13. The shopping cart of claim 12, wherein the first front opening has a length defined in a horizontal direction and a height defined in a vertical direction, wherein the first front opening has a ratio of a minimum length to a minimum height within a range of 1.8:1.

14. A shopping cart comprising:

a frame including a rear handle and a chassis connected to four casters, a shopping cart basket attached to the frame, wherein the shopping cart basket comprises a lower basket portion including a front wall on a front end, an opening on a rear end opposite the front wall, a first side wall extending between the front wall and the rear end, a second side wall extending between the front wall and the rear end opposite the first side wall, and a bottom wall extending between the front wall, the first side wall, and the second side wall, a forward handle region forming an upper portion of the shopping cart basket, wherein the forward handle region includes a main body portion positioned along the front wall of the shopping cart basket, a first side arm that extends from the main body portion along a top of the first side wall of the shopping cart basket for a majority of a length of the first side wall, and a second side arm that extends from the main body portion along a top of the second side wall of the shopping cart basket for a majority of a length of the second side wall, a groove extending along the first side arm, along the main body portion, and along the second side arm between a top groove surface and a lower portion of the shopping cart basket, wherein the groove is configured to receive a support rod to secure the shopping cart basket to the frame, and the lower portion of the shopping cart basket has a honeycomb structure;

wherein the forward handle region includes a first front opening and a second front opening positioned between an upper surface and a lower surface at the front end of the shopping cart basket, wherein the first front opening and the second front opening have a substantially trapezoidal shape, and are separated by a support rib that extends between the upper surface and a top groove surface, and wherein the first front opening has a length defined in a horizontal direction and a height defined in a vertical direction, wherein the first front opening has a ratio of a minimum length to a minimum height within a range of 1.8:1 and 3.4:1, and wherein the second front opening has a length defined in a horizontal direction and a height defined in a vertical direction, wherein the first front opening has a ratio of a minimum length to a minimum height within a range of 1.8:1 and 3.4:1.

15. The shopping cart of claim 14, wherein the forward handle region includes a first corner section located where the first side arm extends from the main body portion and a first corner opening between the upper surface and the top groove surface, and wherein the first corner opening is separated from first front opening by a corner rib extending between the upper surface and the top groove surface.

16. The shopping cart of claim 14, wherein the first side arm includes an elongated recess along an exterior side surface.

* * * * *